Aug. 28, 1934.　　L. T. McGEE ET AL　　1,971,495
BEAN CUTTER
Filed Nov. 29, 1933　　3 Sheets-Sheet 1

INVENTORS
L. T. McGee
R. H. McGee

ATTORNEY

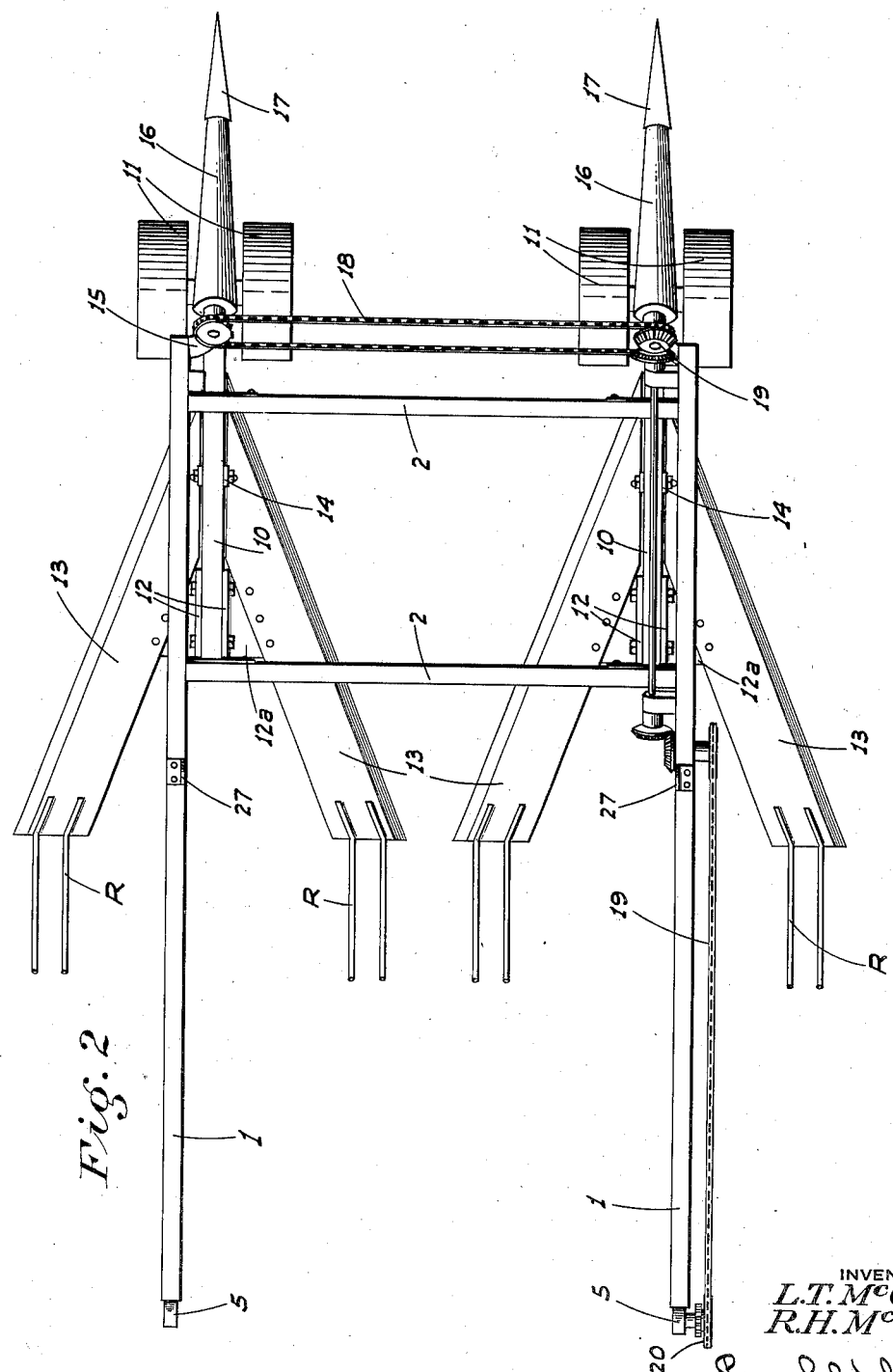

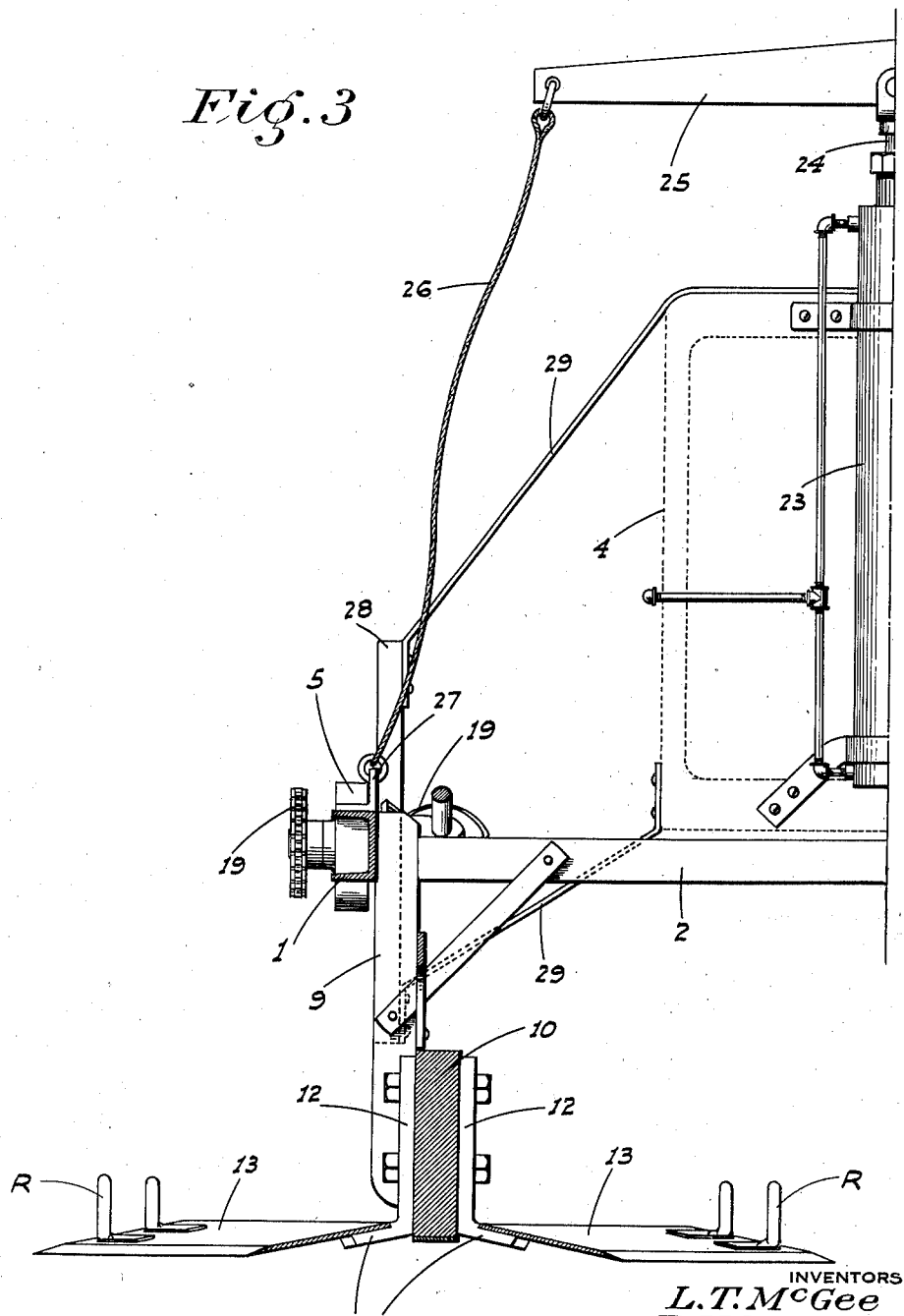

Patented Aug. 28, 1934

1,971,495

UNITED STATES PATENT OFFICE 1,971,495

BEAN CUTTER

Leland T. McGee and Raymond H. McGee, Ripon, Calif., assignors of one-half to Abram Van Weerdhuizen, Ripon, Calif.

Application November 29, 1933, Serial No. 700,274

9 Claims. (Cl. 56—192)

This invention relates to bean cutters, our principal object being to provide a machine for the purpose which is constructed so as to be mounted on a standard tractor to project ahead of the same, whereby the tractor both forms the support and advancing means for the cutter; one which will efficiently untangle and then cut a plurality of rows of bean vines simultaneously without becoming choked; one which may be easily adjusted to cut at different levels; and one which is relatively simple and inexpensive of construction, with a minimum of wearing and moving parts apt to give trouble.

We have also provided a compact readily operated mechanism, mounted on the tractor and connected to the cutter, for raising the same clear of the ground while maintaining the cutter still supported by the frame for transportation.

These objects we accomplish by means of such structure and relative arrangement of parts as will fully appear by a perusal of the following specification and claims.

In the drawings similar characters of reference indicate corresponding parts in the several views:

Figure 2 is a top plan view of the cutter detached from the tractor.

Figure 3 is a half transverse section taken on the line 3—3 of Figure 1.

Figure 1:
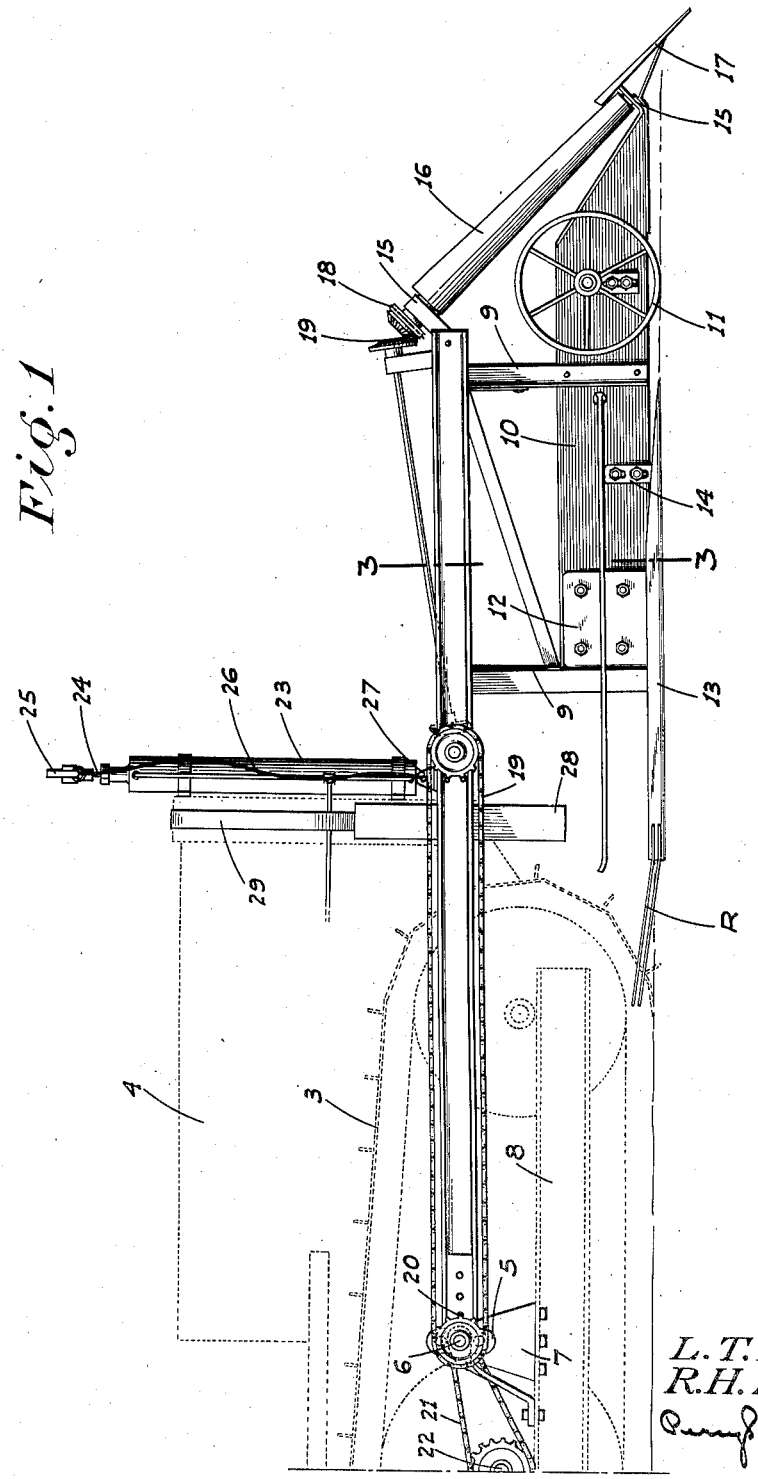
Figure 1 is a side elevation of the cutter as attached to a tractor.

Referring now more particularly to the characters of reference on the drawings, the cutter comprises side frame beams 1 connected at their forward end and intermediate their ends by cross bars 2. The beams are spaced apart sufficiently to extend outwardly of the endless tracks 3 or wheels of a tractor 4. At its rear end each beam is provided with a boss 5 having a vertical row of holes, any one of which at a time is engaged by a pivot pin 6 secured in and projecting from a bracket 7 mounted on the adjacent side frame 8 of the tractor.

Longitudinally spaced hanger bars 9 are secured to and depend from each beam 1 ahead of the tractor, and support a separator board 10 which is secured against said bars and extends parallel to the beam 1, the lower edge of said board being adjacent the ground. A pair of wheels 11 or other ground engaging members is mounted for vertical adjustment on opposite sides of the board in close relation thereto and ahead of the forward hanger bar.

The board 10 also serves as the support for relatively heavy angle brackets 12 which are disposed against the rear end of the board on opposite sides of the same, the lateral legs 12a of the brackets projecting from the opposite sides of the board at the bottom with a slight downward slant toward their outer ends. Cutting blades 13 flatly engage and are secured on said legs of the brackets and project outwardly from the same. These blades are set with a certain divergent angle to the rear, the cutting edges of the blades being of course those along the opposite sides of the blades. The brackets 12 are disposed centrally between the ends of the blades so that the latter are well balanced and need no additional braces, without being unduly heavy.

The blades at the brackets are close to the board so that their inner adjacent edges in front of the brackets are cut parallel to the board so as to clear the same, as shown in Figure 2; the blinds come to a pointed termination at their front ends just back of the wheels, as shown in Figure 2. We preferably mount relatively small brackets 14 on the board 10 to support the cut away and relatively weak portions of the blades adjacent their points to prevent possible deflection of said portions if they should strike an obstruction. The bracket legs 12a having a downward slant laterally, the blades have a similar slant, thus bringing their cutting edges on a level lower than that of the brackets and the bottom of the board 10 as shown in Figure 3, and the brackets and board are thus clear of the ground when the blades are in operation. Suitable vine lifting rods R are secured on and project rearwardly and forwardly from the blades, to positively disengage the cut vines from the ground.

Journaled in bearings 15 mounted on the forward ends of the beams 1 and the boards 10 immediately in front of and longitudinally alined with the latter are rollers 16. These are of tapering form with their small ends at the bottom and they are set with a considerable forward slant toward their lower end. Wedge shaped digging shoes 17 extend lengthwise of the rollers to a point below the same and the boards 10, and are mounted in connection with the lower bearing members 15. The upper ends of the shoes overlap the lower ends of the rollers so that the vines engaged by the shoes will slide onto the rollers without possibly catching on their lower ends, and the lower bearings of the rollers are protected against being jammed by the vines. They are also protected from being engaged by dirt which may be pushed up by the engagement of the shoes with the ground.

The rollers are preferably rotated while the machine is advancing. This may be done in various ways. In the present instance the rollers are connected at their upper ends by a chain drive 18, one end of which is connected to a combination gear and chain drive mechanism 19 extending along one of the beams 1; one of the sprockets 20 of said drive being mounted on the corresponding pivot pin 6. Said sprocket 20 is driven from the tractor in any suitable manner as by a chain drive connected to the adjacent drive axle 22 of the tractor. In this manner the cutter as a whole may be adjusted up or down about the pivot pins 6 without interfering with the driving of the rollers. The said driving of the rollers is of course for the purpose of making them work more efficiently and so that they are practically self-cleaning at all times.

The raising and lowering of the cutter is preferably accomplished by hydraulic means which includes a vertical hydraulic cylinder 23 rigidly secured against the front of the tractor centrally between the frame beams 1. The piston rod 24 projects upwardly from the cylinder and is connected to a cross arm 25 from the ends of which pull cables 26 or other flexible elements extend to eyes 27 on the beams 1. The maintaining of a supply of liquid under pressure and the feeding of the same in controlled relation to the cylinder to effect the rasing or lowering of the arm 25 is done in any convenient manner, which forms no part of this invention, it being understood that such control means is convenient to the operator of the tractor.

Lateral deflection of the beams 1 is prevented by vertical guides 28 engaging the inner faces of the beams 1 and connected to the front of the tractor by suitable means such as braces 29 strapped to the radiator frame.

It will thus be seen that the complete apparatus comprises a pair of duplicate and symmetrical sets of cutting blades and cooperating parts. Each set is supported by a pair of the wheels 11 and the frame as a whole is sufficiently flexible transversely that one side may yield independently of the other as the corresponding wheels engage raises or depressions in the ground. When the apparatus is in operation, after the wheels 11 have been set so that the blades 13 function at the desired level, the cables 26 run slack so as not to interfere with the freedom of vertical movement of the cutter frame.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention what we claim as new and useful and desire to secure by Letters Patent is:

1. A bean cutter including transversely spaced side beams, means pivotally supporting the beams at their rear end for free arcuate movement in a vertical plane, separate vine cutting elements supported by and below the frames toward their forward end, and ground engaging elements separately supporting the frames ahead of the cutting elements.

2. A bean cutter including a longitudinal frame beam, means supporting the beam from the ground, a longitudinal separator board below and supported from the beam, angle brackets mounted on said board on its opposite sides and having lateral legs projecting outwardly from the board, and rearwardly diverging cutting blades supported intermediate their ends on the lateral legs of the brackets.

3. A bean cutter including a longitudinal frame beam, means supporting the beam from the ground, a longitudinal separator board below and supported from the beam, rearwardly diverging cutting blades mounted in connection with the board on opposite sides thereof and adjacent its lower edge, and ground engaging elements mounted on opposite sides of the board close to the same and ahead of the blades.

4. A bean cutter including a longitudinal frame beam, means supporting the beam from the ground, a longitudinal separator board below and supported from the beam, angle brackets mounted on said board on its opposite sides and having lateral legs projecting outwardly from the board, and rearwardly diverging cutting blades resting flatly on and secured to said lateral bracket legs; said legs having a downward slope to their outer edges whereby the blades are similarly disposed.

5. A bean cutter including a longitudinal frame beam, means supporting the beam from the ground, a longitudinal separator board below and supported from the beam, rearwardly diverging cutting blades mounted in connection with the board on opposite sides thereof and adjacent its lower edge, the cutting edges of the blades at their forward end approaching close to the board, and a vine separating roller mounted in connection with the board in front of and in centralized relation thereto.

6. A device as in claim 5, with means to rotate the roller.

7. In combination with a tractor, an implement including side frames extending alongside and ahead of the tractor, means pivoting said frames at their rear end on the tractor for free arcuate movement in a vertical plane, tools supported from the frames ahead of the tractor, and vertically adjustable ground engaging elements supporting said frames ahead of the tools.

8. In combination with a tractor, an implement including side frames extending alongside and ahead of the tractor, means pivoting said frames at their rear end on the tractor for free arcuate movement in a vertical plane, tools supported from the frames ahead of the tractor, means on the tractor to lift the frames, and vertical guide bars mounted on the tractor and engaging the inner faces of the frames intermediate their ends.

9. An implement including side frames, supporting means for the frames, means pivoting the frames at their rear end to the supporting means, tools supported from the frames, ground engaging elements separately supporting the frames ahead of the tools, a vertical hydraulic lift device mounted on the first mentioned supporting means, a transverse cross arm above and connected to the lift device for vertical movement, and flexible pull elements between the ends of the arm and the adjacent frames.

LELAND T. McGEE.
RAYMOND H. McGEE.